Aug. 2, 1966

G. A. BOYD ETAL 3,263,481

PNEUMA-HYDRAULIC FORMING TOOL

Filed Aug. 5, 1963

George A. Boyd
Clifford R. Patterson
INVENTORS

BY Vincent Martin
Joe E. Edwards
M. Harvey Gay
ATTORNEYS

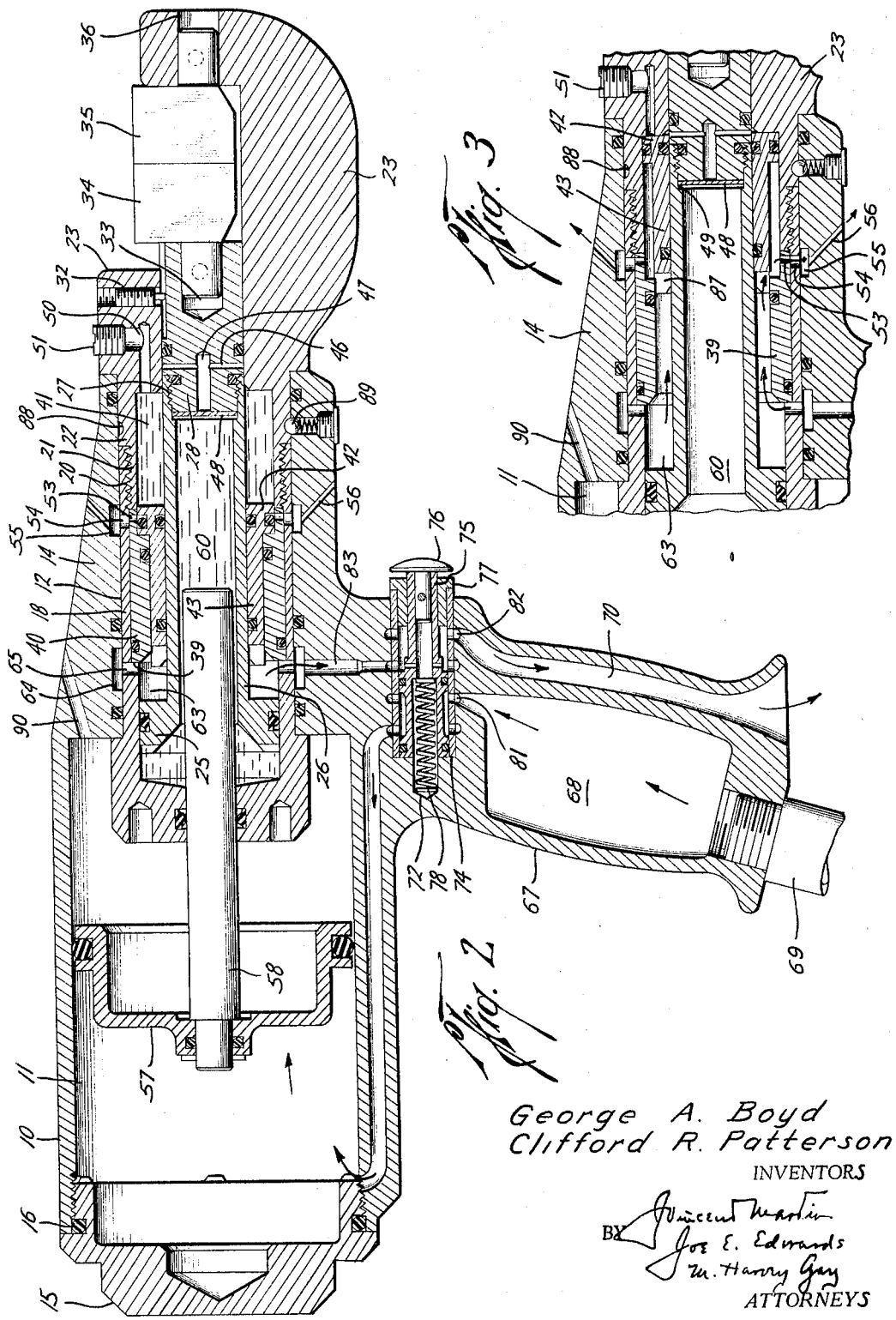

United States Patent Office 3,263,481
Patented August 2, 1966

3,263,481
PNEUMA-HYDRAULIC FORMING TOOL
George A. Boyd, Pasadena, and Clifford R. Patterson, Taft, Calif., assignors to Reed Roller Bit Company, Houston, Tex., a corporation of Texas
Filed Aug. 5, 1963, Ser. No. 299,964
7 Claims. (Cl. 72—453)

This invention relates broadly to power operated tools and more particularly to forming tools and the means for actuating same.

In prior art devices, various means have been employed for moving the coacting die members of a forming tool into engagement with a workpiece to either carry out a particular operation or to produce a certain article. In tools of this type, it has been customary and conventional to employ a split forming die wherein one part is designed to move towards the other part of the die for engaging a workpiece positioned therebetween in order to accomplish the patricular forming operation. The motivating or actuating means that have been employed heretofore in the moving of one of the die members has been either a mechanical means or a hydraulic means or a pneumatic means.

While it has been ascertained that the actuation of a forming tool by either hydraulic or pneumatic means is more efficient and effective in its operation than is the case wherein a mechanical means is employed, the use of a hydraulic or pneumatic medium for effecting the actuation of the forming tool has not always been entirely satisfactory. One of the difficulties that has been encountered in prior art devices is the loss of the hydraulic or pneumatic medium due to leakage and the like. Such a situation could materially reduce the efficiency of such a forming tool due to a loss of power and thus could easily necessitate the same forming operation being repeated a number of times on a piece of work. It has also been found that the use of either hydraulic or pneumatic means for actuating a forming tool has resulted in the tool being rather large and cumbersome. This has been due, to some degree, to the size of the piston or ram member that would be needed to produce and transmit the force to the die members for forming the workpiece positioned between the dies.

One of the objects of the present invention is to provide a forming tool having both a pneumatic and a hydraulic medium for actuating a member to move part of a split die into engagement with a workpiece to perform a certain operation thereon.

Another object is to provide a forming tool having a casing with a pneumatic actuated member designed to compress a hydraulic medium for moving a plunger and die member with a reservoir for replenishing any of the hydraulic medium that might be lost due to leakage and the like.

Another object is to provide a forming tool of the pneumatic-hydraulically actuated type with audible signalling means for indicating the need to replenish the hydraulic actuating medium.

Still further objects of the present invention are to provide a forming tool of the pneumatic-hydraulically actuated type which is efficient and effective in operation, and economical of manufacture and operation.

Other objects and advantages, more or less ancillary to the foregoing in the manner in which all of the various objects are realized, will appear in the following description, which, when considered in conjunction with the accompanying drawings, sets forth the preferred embodiment of the invention.

Referring to the drawings wherein the preferred embodiment of the invention is illustrated:

FIGURE 2 is a vertical sectional view of a forming tool similar to FIGURE 1 and illustrating said tool in an operative condition; and FIGURE 3 is a sectional view of a portion of the forming tool illustrated in FIGURE 1 and showing said tool in a certain condition of operation.

Figure 1:
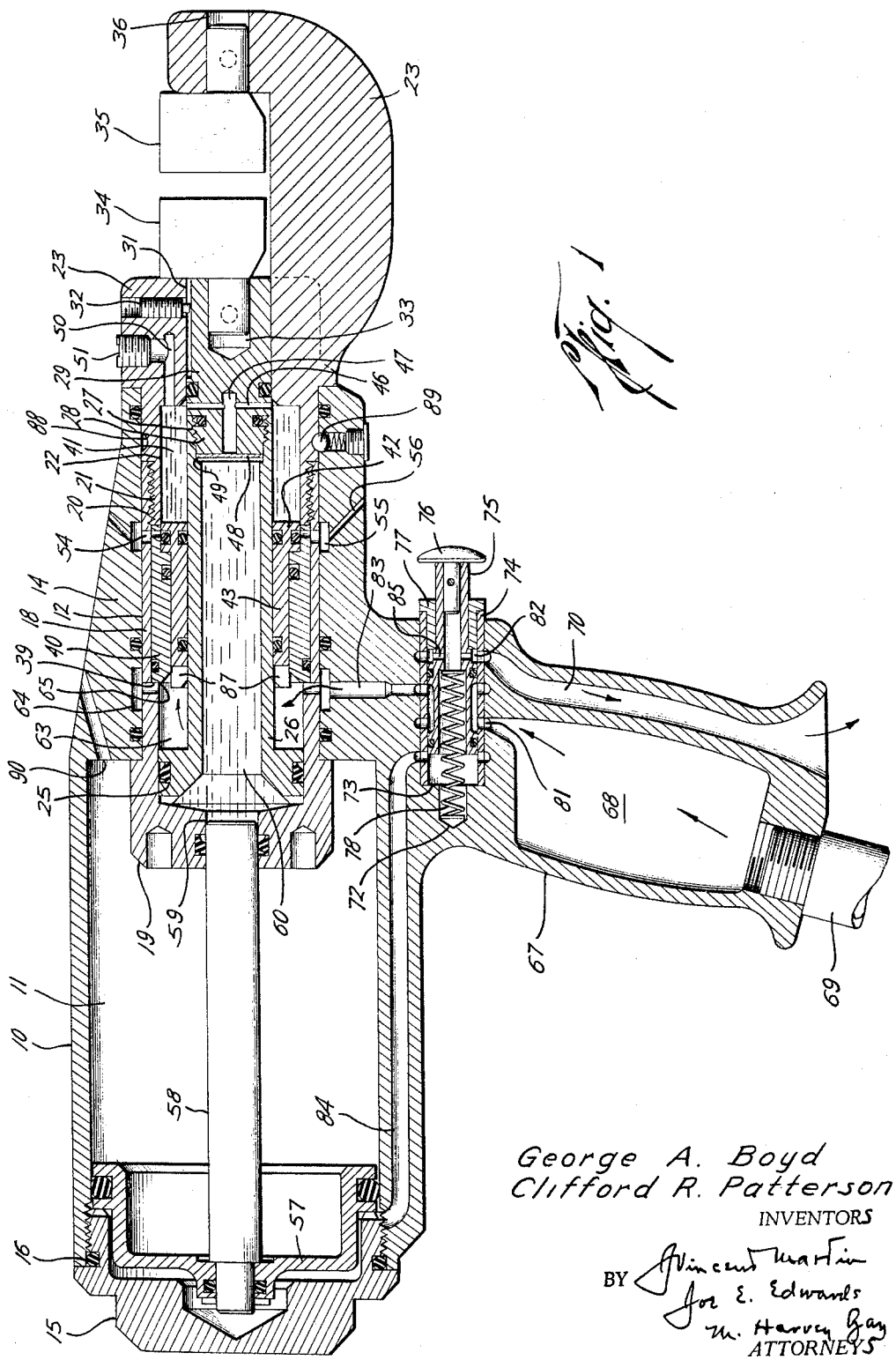
FIGURE 1 is a vertical sectional view of a forming tool embodying the present invention.

Referring to FIGURE 1 there is shown a forming tool having a casing or housing 10 provided with a chamber 11 that terminates in a reduced bore 12 formed in the forward end portion 14 of the housing. The opposite or rear end of the housing 10 has a closure plug 15 threaded therein with a resilient washer 16 interposed between said housing and plug for sealing the chamber 11.

The forward portion 14 of the housing 10 has positioned within the bore 12 a cylinder 18 which has formed on its inner end an enlarged head 19 that extends into the chamber 11 and abutts the forward portion 14. The forward end portion 14 is provided with a plurality of spaced annular recesses for the reception of suitable resilient sealing rings for engaging the cylinder 18. The forward end portion of the cylinder 18 is provided with internal threads 20 that engage external threads 21 formed on the reduced end portion 22 of yoke member 23.

The cylinder 18 has slidably disposed therein a hollow piston like member 25 which has formed integrally therewith a reduced hollow elongated piston rod member 26 that is positioned in spaced parallel relation with the cylinder 18. The hollow piston-rod like member 26 has secured in the lower end thereof, by suitable threads 27, the reduced threaded end portion 28 of a plunger member 29. The plunger 29 is mounted for reciprocatory movement within an opening provided in the yoke member 23 but is restrained against rotative movement therein by means of an axial keyway or slot 31 formed on the outer surface of the plunger and which is engaged by a set screw 32 carried by the yoke member 23. The plunger 29 is formed with a socket 33 within which is mounted a die member 34 while a coacting die member 35 of the split forming die is mounted in a socket 36 provided in the yoke member 23.

The center and forward end portion of the cylinder 18 is counterbored to define an annular ledge 39. An annular collar or plug member 40 is positioned within the cylinder 18 with one end engaging said ledge 39 and the other end abutting the reduced end portion 22 of the yoke member 23. Thus, the collar or plug member 40 is retained in a fixed position within the cylinder 18 and is also disposed in spaced circumferential relationship with the elongated piston rod member 26. The reduced end portion 22 of the yoke member 23 is counterbored to define, in conjunction with the lower end portion of the piston rod member 26, a fluid reservoir or chamber 41 within which a hollow piston like member 42 is mounted for reciprocatory movement. The piston like member 42 has formed integrally therewith a depending sleeve or skirt portion 43 that is slidably positioned between the annular collar 40 and the piston rod member 26. The piston like member 42 and the skirt portion 43 are provided with suitable annular recesses for the reception of conventional O ring sealing members that are adapted to engage the outer surface of the piston rod member 26 and the counterbored surface of the reduced end portion 22 of the yoke member 23 for effectively sealing the piston and skirt-like portion 43 against the leakage of any fluid from the chamber or reservoir 41. The reduced end portion 28 of the reciprocatory plunger 29 is provided with a transverse passageway 46 that communicates with an axial passage 47 to provide fluid communication between the chamber or reservoir 41 and the hollow piston rod member 26. The end portion 28 of the plunger 29 has associated therewith a flapper or wafer valve 48 which controls the flow of fluid through the passage 47 into the interior of the hollow piston rod member 26. The lower end portion of the piston rod 26 is counterbored to define a ledge 49 that limits the movement of the wafer valve 48 with respect to the end portion 28 and passage 47. The yoke member 23 is formed with a passageway 50 that communicates with the fluid reservoir or chamber 41 so that the supply of oil or other fluidic medium may be readily replenished whenever necessary and said passageway is closed by a threaded sealing plug 51.

The annular collar or plug member 40 is formed with a reduced end portion for receiving the piston like member 42 and limit its movement in one direction within the cylinder 18. This reduced end portion of the plug member is provided with a port 53, FIGURE 3, which registers with a port 54 formed in the cylinder 18 that in turn communicates with an annular recess 55 formed in the forward end portion 14 of the housing 10. A passageway 56 is formed in the portion 14 of the housing 10 and it communicates with the annular recess 55 and the external surface of said housing 10 in order to vent said recess to the atmosphere.

The chamber 11 of the housing 10 is provided with a reciprocating piston 57 that has secured thereto one end of a plunger or ram 58 with the other end of said ram extending through an opening 59 provided in the enlarged head 19 of the cylinder 18. The piston-like member 25 and hollow piston rod 26 define within said cylinder 18 a cavity 60 for the reception of a fluid medium, such as oil, which is adapted to be displaced and compressed by the ram 58 as it moves through the opening 59 in the enlarged head 19. The external surface of the piston 25 and the opening 59 in the enlarged head 19 are provided with suitable resilient sealing members, of any well known type, to insure the retention of the oil or fluid within the cavity 60 and prevent the seepage of said oil or fluid into the cylinder 18 and the chamber 11. The lower or bottom face of the piston 25 is spaced from the end of the collar or plug member 40 and the end of the skirt portion 43 of the piston 42 to define therewith a chamber 63 that is in communication with an annular recess 64 formed in the reduced end portion 14 of the housing 10 by means of a passage 65 provided in the cylinder 18 adjacent the annular ledge 39.

The housing or casing 10 has formed integrally therewith a depending handle 67, of the pistol grip type, which is provided with a compartment 68 that is in communication with a source of compressed air through the inlet hose 69. The handle 67 is also formed with an exhaust passage 70 that communicates with the atmosphere. The handle 67 is formed with a transverse bore 72 that is counterbored as at 73 for the reception of a ported sleeve member 74 that is in communication with the compartment 68 and passage 70. The sleeve member 74 has slidably mounted therein a throttle valve sleeve 75 which is formed with a reduced end portion that carries an actuating button 76. A plug like member 77 is interposed between the sleeve 74 and the reduced end portion of the throttle valve sleeve 75 to guide the throttle valve sleeve in its movement within the sleeve member 74 and to limit the movement of the throttle valve sleeve 75 under the action of a compression spring 78 that is positioned in the bore 72 in the handle 67. The enlarged portion of the throttle valve sleeve 75 is provided with an annulus 81 while a smaller annulus 82 is formed on the reduced end portion of the throttle valve sleeve 75 adjacent the plug member 77. One of the ports in the sleeve member 74 provides communication between the chamber 68 and the annulus 81 while another provides communication through a passageway 83 between the annulus 81 and the annular recess 64 in the reduced end portion 14 of the housing 10. Another port in the sleeve 74 communicates with a passageway 84 formed in the housing 10 for delivering air to the rear face of the piston 57 in the chamber 11. The reduced portion of the throttle valve sleeve 75 is formed with ports 85 which communicate with the interior of said sleeve and the annulus 82 when the sleeve 75 is in abutting engagement with the plug member 77. This arrangement places the portion of the casing 11 between the closure plug 15 and piston 57 in communication with the exhaust passage 70 while at the same time the compartment 68 is in communication with the chamber 63 by way of the annulus 81 and passageway 83.

The reduced end portion 22 of the yoke member 23 is provided on its outer surface with a plurality of spaced recesses or detents 88 which are adapted to receive a spring loaded ball member 89 mounted in the forward end portion 14 of the housing 10. This permits the yoke member 23 and cylinder 18 together with piston 25, rod member 26, plunger 29 and plug member 40 and piston 42 to rotate as a unit within the reduced end portion 14 of the housing 10. This rotative movement as a unit permits the housing 10 and handle 67 to be maintained in the same position by the operator, yet facilitates the positioning of the die members 34 and 35 for readily engaging or receiving a workpiece upon which the forming operation is to be performed. The reduced end portion 14 of the housing 10 is formed with a vent passageway 90 which provides communication between the chamber 11 and the atmosphere so that any air or oil which might seep past the sealing rings carried by the piston 57 or past the sealing means provided in the opening 59 in the enlarged head 19 may be vented to the atmosphere.

In the operation of the forming tool of the present invention, the various components thereof are in a static or ready state as shown in FIGURE 1, at which time the passageway 84 and passage 70 are in communication with the atmosphere for exhausting any air entrained within the casing 11 between the piston 57 and the closure plug 15. The compressed air within the compartment 68 is delivered to the annulus 81 and through the passage 83 to the annular recess 64 and from there through the port 65 to the chamber 63 for maintaining the piston 25 and plunger 29 in a retracted position whereby the forming dies 34 and 35 are separated for the reception of a workpiece. The workpiece having been positioned between the forming dies, the button 76 is depressed which moves the throttle valve sleeve 75 within the sleeve member 74 and compresses the spring 78. This action moves the annulus 81 out of registry with the passage 83 and into registry with passageway 84 as the throttle valve sleeve is bottomed in the counterbore 73 whereby the annulus 82 is brought into registry with the passageway 83 for the purpose of evacuating the air from the chamber 63 by means of the port 85 and the passage 70 in the handle 67. The delivery of air under pressure from the compartment 68 through passageway 84 to the rear face of the piston 57 causes said piston and ram 58 to move within the chamber 11 so that said ram moves through the opening 59 in the enlarged head 19 of the cylinder 18 into the cavity 60 which action results in a displacement of some of the oil in said cavity to act upon the piston 25 and at the same time, substantially increases the pressure of the oil remaining within the cavity. The oil displaced from the cavity 60 acts on the upper face of the piston 25 and against the head 19 in conjunction with the oil compressed in the cavity 60 by the movement of the ram 58 to cause said piston and piston rod 26 to move the plunger 29 through the yoke 23. The piston 57 and ram 58 as well as the piston 25 and piston rod 26 and plunger 29 continue to move under the pressure of the air delivered to the rear face of the piston 57 so that a high pressure is imparted to the plunger 29 for forming the workpiece between the die members 34 and 35.

Upon the completion of the forming operation, pressure is removed from the actuating button 76 so that the spring 78 returns the throttle valve sleeve 75 to the position as shown in FIGURE 1. This movement of the throttle valve sleeve to its initial position brings the passageway 84 into communication with the exhaust passage 70 by way of the ports 85 and annulus 82, and at the same time, brings annulus 81 into registry with compartment 68 and passage 83 for delivering air under pressure to the chamber 63 in the cylinder 18. The introduction of air into the chamber 63 causes the piston 25 and piston rod 26 and plunger 29 to be moved towards the enlarged head 19 of the cylinder 18 thus separating the die members 34 and 35. This movement of the piston 25 and plunger 29 also causes the plunger 58 and piston 57 by means of the fluid in cavity 60 to be moved from the position as shown in FIGURE 2 of the drawings to its initial static free or ready state position as shown in FIGURE 1 of the drawings thereby exhausting all of the air in back of the piston 57 by way of the passageway 84 and exhaust passage 70.

After the forming operation has been completed and air is delivered to the chamber 63, the loss of any oil from the cavity 60 is replaced or replenished by oil from the fluid reservoir or chamber 41. When air is delivered to the chamber 63, it acts upon the rear or skirt portion 43 of piston 42 in an effort to move said piston into the fluid reservoir or chamber 41. When due to loss of oil, the pressure in cavity 60 is then less than the pressure in reservoir 41, the piston 42 will move into chamber 41 under the pressure of the air in chamber 63 and force oil through the passageways 46 and 47 and unseat wafer valve 48 to deliver the oil to the cavity 60. The movement of the piston 42 within the reservoir 41 and the delivery of oil to the cavity 60 will terminate upon an equalization of pressures within the respective areas. The wafer valve 48 will be seated upon the next operation of the tool as the ram 58 moves into the cavity 60.

In the event that the oil in the reservoir 41 should become depleted and the piston 42 under the pressure of the air in the chamber 63 forced forward to the end of the reservoir 41, the notches 87 in the end of the skirt portion 43 will uncover the ports 53 and 54 in the plug member 40 and cylinder 18, FIGURE 3, so that air from the chamber 63 will pass into the annular recess 55 and then through the vent passageway 56 to the atmosphere where an audible sound will be created by the escape of said air and act as a warning signal to the operator of the tool that the supply of oil in the reservoir 41 needs to be replenished.

In replenishing the oil in reservoir 41, it is delivered through passageway 50 upon the removal of closure plug 51 and the flow of oil through passageway 50 will cause the piston 42 to be moved back to its rear most position within the cylinder 18. The rear most position of the piston 42 within the cylinder 18 causes the O ring seal members carried by the piston 42 to move beyond the port 53 which action is deliberate so as to uncover these ports as well as port 54 to provide communication with the annular recess 55 and the vent passageway 56. By so moving the piston to its rear most position in the cylinder 18, and uncovering the ports 53 and 54, the oil that is delivered to the reservoir 41 will force any air that might be entrapped therein through said ports to the atmosphere. Thus, when oil starts seeping through the ports 53 and 54 and vent passageway 56, the operator is then assured that the reservoir 41 has been completely filled with oil and closure plug 51 may then be inserted in the yoke member 23. Upon the filling of the reservoir 41 and the reactivating of the tool by connecting same to the source of compressed air, the air will flow from compartment 68 through passageway 83 into the chamber 63 and act upon the rear end portion of the piston 42 for moving same slightly forward whereby the O ring sealing members in the piston 42 will close and seal the ports 53 and 54 so that in this condition the tool will then be in its ready-state for having a piece of work to be formed placed between the coacting die members 34 and 35.

Although the foregoing description is necessarily of a detailed character, in order that the invention may be completely set forth, it is to be understood that the specific terminology is not intended to be restrictive or confining and that various rearrangements of parts and modifications of detail may be resorted to without departing from the scope or spirit of the invention as herein claimed.

We claim:

1. A forming tool comprising a casing, a cylinder mounted within one end of said casing, a yoke member secured to said cylinder and arranged to project beyond said end of the casing, a plunger slidably mounted in a portion of said yoke, a die carried by said plunger, a second die carried by another portion of said yoke in alignment with the first die to receive a piece of work to be formed, a piston having a hollow depending rod portion slidably mounted in said cylinder, said plunger secured to the hollow depending rod portion of said piston and defining therewith a fluid containing cavity, means in said cylinder arranged in concentric relation with said hollow depending rod and defining with said piston a chamber, a piston slidably mounted in the other end of said casing, a ram carried by said last mentioned piston and arranged to extend through said cylinder into said fluid containing cavity, said casing connected to a source of compressed air, means carried by said casing for controlling the delivery of air to said casing for moving said piston and ram in said casing to compress said fluid to move as a unit the piston and plunger with the die for engaging and forming the workpiece, and said means controlling the evacuation of the air from the casing contemporaneous with the delivery of air to said chamber to retract the piston and plunger for separating said dies.

2. A forming tool comprising a casing, a cylinder mounted within one end of said casing, a yoke member secured to said cylinder and arranged to project beyond said end of the casing, a plunger slidably mounted in a portion of said yoke, a die carried by said plunger, a second die carried by another portion of said yoke in alignment with the first die to receive a piece of work to be formed, a piston having a hollow depending rod portion slidably mounted in said cylinder, said plunger secured to the hollow depending rod portion of said piston and defining therewith a fluid containing cavity, means interposed between said cylinder and hollow depending rod, said means being spaced from said piston and yoke member to define with said piston a chamber and with said yoke member a fluid containing reservoir, said cavity being in fluid communication with said reservoir, a piston slidably mounted in the other end of said casing, a ram carried by said casing piston and arranged to extend through said cylinder into said fluid containing cavity, said casing connected to a source of compressed air, means carried by said casing for controlling the delivery of air to said chamber for moving at least one of said means into said reservoir for forcing fluid from said reservoir into said cavity.

3. A forming tool comprising a casing, a cylinder mounted within one end of said casing, a yoke member secured to said cylinder and arranged to project beyond said end of the casing, a plunger slidably mounted in a portion of said yoke, a die carried by said plunger, a second die carried by another portion of said yoke in alignment with the first die to receive a piece of work to be formed, a piston having a hollow depending rod portion slidably mounted in said cylinder, said plunger secured to the hollow depending rod portion of said piston and defining therewith a fluid containing cavity, means interposed between said cylinder and hollow depending rod, said means being spaced from said piston and yoke member to define with said piston a chamber and with said yoke member a fluid containing reservoir, said cavity being in fluid communication with said reservoir, valve means interposed between said reservoir and cavity to control the passage of fluid therebetween, a piston slidably mounted in the other end of said casing, a ram carried by said casing piston and arranged to extend through said cylinder into said fluid containing cavity, said casing connected to a source of compressed air, control means carried by said casing for directing air into said chamber for moving at least one of said means into said reservoir for forcing fluid from said reservoir to open said valve means into said cavity and said control means being operable to discontinue the delivery of air to said chamber and to direct air to the casing for moving the piston and ram to compress the fluid in said cavity to move as a unit the piston and the plunger with the die for engaging and forming the workpiece.

4. A forming tool comprising a casing, a cylinder mounted within one end of said casing, a yoke member secured to said cylinder and arranged to project beyond said end of the casing for receiving a workpiece, a plunger slidably mounted in a portion of said yoke for engagement with said workpiece, a piston having a hollow depending rod portion slidably mounted in said cylinder, said plunger secured to said rod portion and defining therewith a fluid containing cavity, a piston and ram slidably mounted in the other end of said casing in alignment with said cylinder, said ram projecting into said cavity for compressing the fluid therein and moving the plunger into engagement with the workpiece, said casing connected to a source of compressed air, control means for directing air to said casing for moving the piston and ram therein, a reservoir provided in said cylinder and yoke member, said reservoir being in fluid communication with said cavity, means to replenish any fluid lost by the action of said ram, said means including a piston positioned within said cylinder in concentric relation to said rod portion and spaced from said first mentioned piston to define therewith a chamber, a passageway interposed in said casing between said chamber and control means for directing air to said chamber to engage said third mentioned piston and move same into said reservoir to deliver fluid to said cavity.

5. A forming tool comprising a casing, a cylinder mounted within one end of said casing, a yoke member secured to said cylinder and arranged to project beyond said end of the casing for receiving a workpiece, a plunger slidably mounted in a portion of said yoke for engagement with said workpiece, a piston having a hollow depending rod portion slidably mounted in said cylinder, said plunger secured to said rod portion and defining therewith a fluid containing cavity, a piston and ram slidably mounted in the other end of said casing in alignment with said cylinder, said ram projecting into said cavity for compressing the fluid therein and moving the plunger into engagement with the workpiece, said casing connected to a source of compressed air, control means for directing air to said casing for moving the piston and ram therein, a reservoir provided in said cylinder and yoke member, said plunger having passageways therein providing communication between said cavity and reservoir, a valve member interposed between said rod portion and plunger to control the flow of fluid from said reservoir to said cavity for replenishing the fluid in the cavity lost by the action of said ram, a piston slidably mounted within said cylinder in concentric relation to said rod portion, said last mentioned piston being spaced from said first mentioned piston to define therewith a chamber, a passageway interposed in said casing between said chamber and control means for directing air to said chamber to move said last mentioned piston into said reservoir for unseating said valve and delivering fluid to said cavity.

6. A forming tool comprising a casing, a cylinder mounted within one end of said casing, a yoke member secured to said cylinder and arranged to project beyond said end of the casing for receiving a workpiece, a plunger slidably mounted in a portion of said yoke for engagement with said workpiece, a piston having a hollow depending rod portion slidably mounted in said cylinder, said plunger secured to said rod portion and defining therewith a fluid containing cavity, a piston and ram slidably mounted in the other end of said casing in alignment with said cylinder, said ram projecting into said cavity for compressing the fluid therein and moving the plunger into engagement with the workpiece, said casing connected to a source of compressed air, control means for directing air to said casing for moving the piston and ram therein, a reservoir provided in said cylinder and yoke member, said plunger having passageways therein providing communication between said cavity and reservoir, a valve member interposed between said rod portion and plunger to control the flow of fluid from said reservoir to said cavity for replenishing the fluid in the cavity lost by the action of said ram, a piston slidably mounted within said cylinder in concentric relation to said rod portion, said last mentioned piston being spaced from said first mentioned piston to define therewith a chamber, a passageway interposed in said casing between said chamber and control means for directing air to said chamber to move said last mentioned piston into said reservoir for unseating said valve and delivering fluid to said cavity, said cylinder having a port formed therein, said casing having a passageway registerable with said port and said last mentioned piston uncovering said ports upon movement into said reservoir to vent said chamber.

7. A forming tool comprising a casing, a cylinder mounted within one end of said casing, a yoke member secured to said cylinder and arranged to project beyond said end of the casing, resilient sealing means positioned in said casing and engageable with said cylinder and yoke member, a plunger slidably mounted in a portion of said yoke, a die carried by said plunger, a second die carried by another portion of said yoke in alignment with the first die to receive a piece of work to be formed, a piston having a hollow depending rod portion slidably mounted in said cylinder, said plunger secured to the hollow depending rod portion of said piston and defining therewith a fluid containing cavity, means interposed between said cylinder and hollow depending rod, said means being spaced from said piston and yoke member to define with said piston a chamber and with said yoke member a fluid containing reservoir, resilient sealing elements positioned in said means and engageable with said cylinder and hollow depending rod portion, said cavity being in fluid communication with said reservoir, said cylinder and yoke member with said means and piston and hollow depending rod being rotatable as a unit within said casing, means mounted in said casing and engageable with said unit for restricting the rotative movement of said unit, a piston slidably mounted in the other end of said casing, a ram carrier by said casing piston in alignment with said cylinder and extendable into said cavity for compressing the fluid therein and moving said plunger and die towards said second die for forming said workpiece, said casing connected to a source of compressed air, control means mounted in said casing for directing air to said chamber for moving at least one of said means into said reservoir to replenish any fluid lost from said cavity, and said control means being operable to direct air to said casing for moving the piston and ram therein contemporaneous with the venting through said control means the air in said chamber.

References Cited by the Examiner

UNITED STATES PATENTS 2,139,639    12/1938    Macconochie _____ 78—42
2,941,430    6/1960    Klinger _____ 72—453

FOREIGN PATENTS 19,543    3/1905    Austria.

CHARLES W. LANHAM, *Primary Examiner.*

G. P. CROSBY, *Examiner.*